United States Patent

[11] 3,623,027

[72] Inventor Robert L. Williams
Richardson, Tex.

[21] Appl. No. 813,186
[22] Filed Apr. 3, 1969
[45] Patented Nov. 23, 1971

[73] Assignee Texas Instruments Incorporated
Dallas, Tex.

[54] SOLID-STATE LIGHT-SENSITIVE STORAGE DEVICE
12 Claims, 3 Drawing Figs.

[52] U.S. Cl. .......... 340/173LS, 307/117, 340/173 LT, 340/173 CR
[51] Int. Cl. .......... G11c11/34, G11c 11/42
[50] Field of Search .......... 250/208; 307/117; 340/173, 173 LT

[56] References Cited

UNITED STATES PATENTS 3,059,115 10/1962 Lempicki .......... 340/173 L
3,118,130 1/1964 Rediker .......... 340/173
3,341,825 9/1967 Schrieffer .......... 340/173

*Primary Examiner*—Terrell W. Fears
*Attorneys*—Samuel M. Mims, Jr., James O. Dixon, Andrew M. Hassell, Harold Levine, Melvin Sharp, William E. Hiller and John E. Vandigriff

ABSTRACT: A PN-junction target in an information storage system stores an electronic charge pattern that varies in accordance with the quantity of illumination incident thereon. The target comprises a high resistivity semiconductor substrate having a single large PN-junction formed therewith that extends over one surface of the high resistivity section. The PN-junction may be formed by diffusing an impurity into the high-resistivity substrate or by epitaxially growing a crystal on the substrate. A single PN-junction target provides good charge separation for improved sensitivity of the storage device to small quantities of illumination incident thereon.

INVENTOR
ROBERT L. WILLIAMS

SOLID-STATE LIGHT-SENSITIVE STORAGE DEVICE

This invention relates to an information storage device, and more particularly to a single PN-junction target in an information storage system.

A number of different electronic cameras have been developed for television and related optical image and other data transmission systems. Of these, the vidicon tube has the inherent advantages of high sensitivity, small size, and simple mechanical construction. One type of vidicon tube utilizes a target consisting of a silicon slice into which an array of PN-junction diodes has been formed. Vidicon tubes of this design utilize the array of discrete PN-junctions to convert an optical image to a stored charge pattern which is periodically scanned and erased by an electron beam. The act of erasing the charge pattern with the electron beam creates the video signal.

Basically, the PN-junction target array comprises a semiconductor substrate covered on one side with a thermally grown silicon-dioxide layer. By means of photo masking and etching techniques, an aperture pattern is formed through the silicon-dioxide layer to expose the substrate. The array of PN-junctions is formed through the openings in the silicon-dioxide layer by deposition and diffusion techniques.

Light associated with an image to be stored is incident on the target and absorbed, thereby creating hole-electron pairs. By proper selection of the target thickness and the absorption coefficient of the target material, most of the hole-electron pairs will be generated near the incident surface. The holes will then diffuse to the depletion region of the diodes in the array, thereby discharging the diodes by an amount proportional to the light intensity. Unfortunately, not all the holes diffuse to the depletion region and these cause a loss in light sensitivity and resolution due to recombination and diffusion.

Another shortcoming with vidicon tube targets fabricated as described above is that the silicon-dioxide film is highly resistive ($10^{17}$ ohms per square). This high-resistance film prevents charge conduction from the film to the PN-junctions which is essential to the operation of these devices. As a result, the silicon-dioxide layer retains a charged state and poor images are produced.

In an effort to overcome the problem of charge retention in the silicon-dioxide layer, a film of antimony-trisulfide was vapor deposited from a thermally heated source onto the silicon-dioxide film. To obtain the proper resistivity for the desired charge conduction, a film 1,000 Angstroms thick was required. This thick film may cause an unacceptable lag in charge conduction and produce poor contrast.

An object of the present invention is to provide a target in an information storage system having good charge separation. Another object of this invention is to provide a target in an information storage system wherein minority carrier trapping effects are minimized. A further object of this invention is to provide improved resolution and sensitivity for a storage device in an information storage system. Yet another object of this invention is to provide a single PN-junction target in an information storage system.

In accordance with the present invention, a target for storing information in the form of an electronic charge pattern varying in accordance with the quantity of illumination incident thereon includes a high-resistivity semiconductor substrate. A single PN-junction is formed to extend over the active region of one surface of the high-resistivity semiconductor substrate by diffusion or epitaxial techniques. The PN-junction formed at the high-resistivity substrate forms a depletion region at the junction that can be extended by a scanning electron beam. To define the active area of the target and isolate this area, a guard ring surrounds the active PN-junction region. This guard ring may be formed at the same time as the PN-junction.

A more complete understanding of the invention and its advantages will be apparent from the specification and claims and from the accompanying drawings illustrative of the invention.

Referring to the drawings.

Although the invention will be described with respect to a vidicon tube target application, it will be understood that single PN-junction targets may also be applied to image storage tubes, image converter tubes, or the like.

Figure 1:
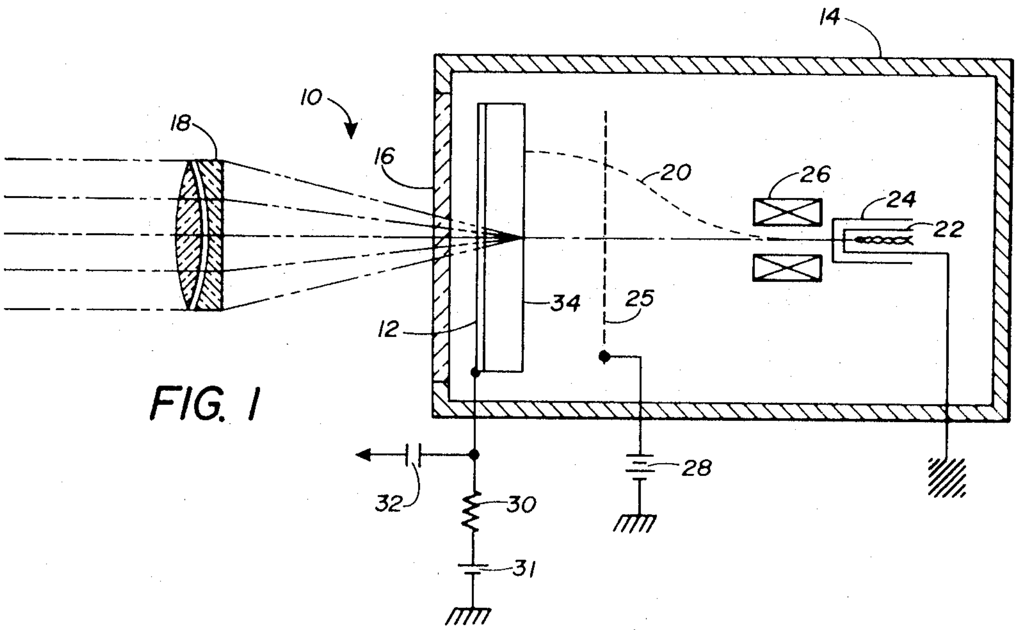
FIG. 1 is a simplified schematic diagram of an electronic camera in accordance with one application of the present invention.

Referring now to the drawings, and in particular to FIG. 1, a video camera in a highly simplified form is indicated generally by the reference numeral 10. The video camera is of conventional design except for the optical image storage device 12, commonly referred to as the target. The target 12 is located in an evacuated tube 14. An optical image may be focused on a target 12 through a window 16 by lens system 18. A low energy electron beam 20 passes from a cathode 22 through apertured anode 24 and is scanned over the face of the target 12 by conventional deflection means represented at 26. Electrons from the cathode 22 are accelerated to the required energy level by the positive potential of a voltage source 28 connected to a grid 25. Current is produced through a load resistor 30 when the electron beam strikes the target producing a video output signal at a capacitor 32, as will hereafter be described in greater detail. The target 12 is biased to a positive level by a voltage source 31.

Figure 2:
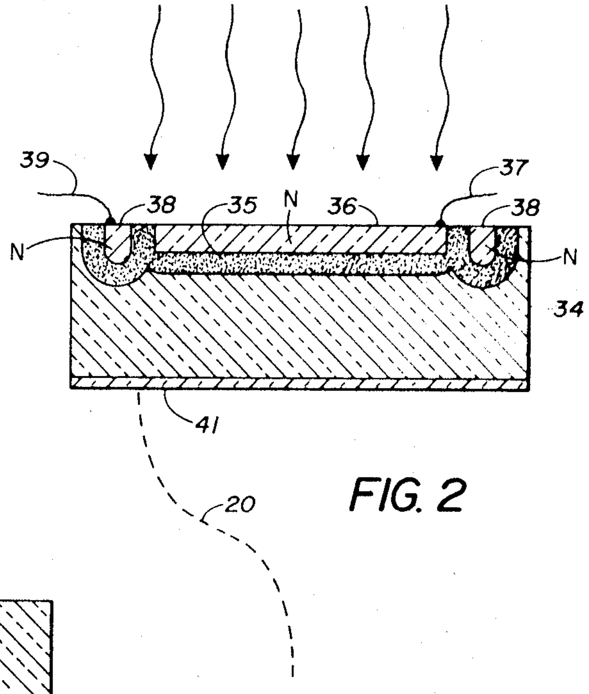
FIG. 2 is a cross section of a target having a thick layer depletion region.

The target 12 is fabricated from a monolithic slice of a semiconductor material region 34, as illustrated in FIG. 2. Typically, the semiconductor material 34 may be P-type silicon having a high resistivity, on the order of 1,000 ohm-cm. or greater. A PN-junction is formed in the material 34 by surface diffusion of an N-type impurity 36. The PN-junction may also be formed by other well-known techniques, such as epitaxially growing a crystal to the material 34. By photo masking and etching techniques, a guard ring 38 of an N-type material is formed around the N-type impurity region and may extend deeper into the P-type region 34 than the region 36. Ohmic contact is made to the target 12 by suitable conventional means represented at 40. To insure that unwanted current sources do not occur on the election beam side of the region 34, a high-resistivity layer 41 is formed thereon.

Operationally, the target 12 acts as an optical image storage device during each scan cycle of the electron beam 20, which is typically the same as that used in commercial television. As the electron beam scans the target 12 the depletion layer 35 between the regions 34 and 36 grows from the PN-junction into the P-type region 34. If the voltage source 31 provides a high enough bias voltage, the electron beam 20 will extend the depletion region 35 to the electron beam side of the target 12. The resulting depletion layer acts as a dielectric in a capacitor with the electron beam side of the semiconductor material 34 acting as one plate and the PN-junction acting as another plate. The capacitance of the PN-junction is charged by the scanning electron beam 20 and tends to hold this charge at a high level throughout the scan period, although the charge is reduced by an amount dependent upon the reverse conductance and capacitance, or the RC time constant, of the barrier.

Incident light focused on the target 12 by the image system 18 creates hole-electron pairs in the N-type region 36 in proportion to the amount of light incident upon the target. Charge separation occurs at the PN-junction with the electrons remaining in the N-type region 36. The holes, however, migrate to the P-side of the junction and reduce the stored charge by a proportional amount. When the electron beam 20 again passes during the next scan cycle, the localized area subjected to the electron bombardment is again charged to a level determined by the voltage source 31 and the load resistor 30. This produces a current through the load resistor 30 proportional to the amount of light, thus producing a video output voltage through the capacitor 32.

Of particular significance, since the entire P-type region 34 grows into a depletion layer, and since charge separation takes place at the PN-junction, no trapping of the carriers occurs and in the P-region the charge bleedoff due to absorbed photons is more accurately proportional to the amount of incident light on the target. Because no trapping of carriers occurs, a single junction target is also capable of very high resolution as a result of a minimum of charge spreading by lateral diffusion while the charges are drifting across the depletion layer.

The guard ring 38 serves to isolate the edge leakage and define the active center portion of the target 12. The guard ring 38 may be grounded or biased by suitable means connected to the lead 39. A lead 37 provides a conventional means for connecting the target to the video circuit, such as the resistor 30 and the capacitor 32.

Figure 3:
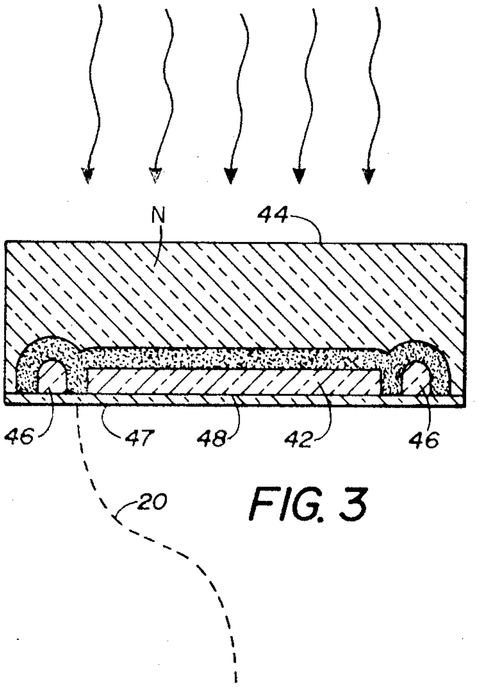
FIG. 3 is a cross section of a target having a thin layer depletion region.

The target illustrated in FIG. 2 may be classified as having a thick depletion layer; that is, the region 34 is thicker than the region 36. Referring to FIG. 3, there is shown a target having a thin depletion region 42. To fabricate a target as illustrated in FIG. 3, a P-type high-resistivity material is epitaxially grown onto the N-type semiconductor material is epitaxially grown onto the N-type semiconductor material 44 to form the region 42. A guard ring 46 may then be formed in the target to extend through the PN-junction to define and isolate the active region. Again, the surface of the target subjected to the electron beam bombardment will be treated to form a high-resistivity layer 47 to minimize the possibility of unwanted current sources from occurring.

When the electron beam 20 scans the surface of the P-type region, the depletion layer of the PN-junction grows principally into the region 42, as was explained previously with respect to the target illustrated in FIG. 2. Photons absorbed near the surface of the region 44 produce hole-electron pairs which diffuse to the PN-junction where the hole-electron pairs separate. The holes continue across the depletion layer into the region 42 to the electron charged surface 48. The light created holes in the region 44 cause the junction to return to the potential of the source 31. The scanning electron beam 20 must then redeposit electrons upon the junction to bring it back to a charged potential. Again, as explained previously, this redepositing of electrons produces a current through the load resistor 30 proportional to the light incident of the target 12, thus producing a video output voltage through the capacitor 32.

The semiconductor material of either the thick or thin depletion layer targets in normally selected to provide the most efficient response to the particular portion of the light energy spectrum of interest. Silicon, germanium and gallium arsenide are of particular importance, The impurity concentration of the semiconductor material should be selected to provide the longest possible storage time, i.e., the minimum dark current for most applications. In one example of a thick depletion layer target, a high resistivity P-type gallium arsenide doped with chromium was chosen as the semiconductor material.

An N-type region was epitaxially grown to the gallium arsenide to produce a single PN-junction extending over one complete surface of the target. The N-type epitaxially grown layer forms a low-resistivity area for good electrical contact to the target 12.

For a given application, the desired sensitivity of the target will determine whether to use a thick depletion layer target or a thin depletion layer target. A thick depletion layer has a low capacitance and has a high sensitivity for low incident light conditions. On the other hand, a thin depletion layer produces a high capacitance and has a low sensitivity for high-incident light conditions. The thicker the depletion layer, the higher the cathode potential that must be used to grow the depletion layer to the surface exposed to the electron beam 20. For a target having a depletion region with a resistivity of 10,000 ohm-cm., a target 3 mills thick operates at a cathode potential of about 3 volts. With the same resistivity a target 10 mills thick requires about 30 volts bias at 31.

Although the invention has been described as used in an electron beam reading system, it should be understood that the targets described herein may be used in other target reading systems.

While only one embodiment of the invention, together with modifications thereof, has been described in detail herein and shown in the accompanying drawings, it will be evident that various other modifications are possible without departing from the scope of the invention.

What is claimed is:

1. A storing device in an information system where data is stored in the form of an electronic charge pattern that varies in accordance with the quantity of illumination incident on the storing device comprising:
- a high-resistivity semiconductor substrate, and
- a single PN-junction formed to extend over the active region of one surface of said substrate and producing a depletion region therewith that is caused to grow by scanning electron beam, said PN-junction being surrounded by a guard ring to isolate the active area of said storing device.

2. A storing device in an information system as set forth in claim 1 including a high-resistivity layer overlying the surface of said substrate opposite said PN-junction.

3. A storing device in an information system as set forth in claim 1 wherein said high-resistivity semiconductor substrate is P-type silicon having a resistivity of at least 1,000 ohms-cm.

4. A storing device in an information system as set forth in claim 3 wherein said PN-junction is formed by diffusing an N-type impurity into the P-type substrate.

5. A storing device in an information system wherein data is stored in the form of a charge pattern that varies in accordance with the quantity of illumination incident on the storing device comprising:
- an N-type high-resistivity semiconductor substrate, and an epitaxial layer of P-type semiconductor material extending over the active region of one surface of said substrate and producing a single PN-junction therewith, a depletion region being formed adjacent said PN-junction that is caused to grow by a scanning electron beam to extend throughout the thickness of said epitaxial layer, said depletion region minimizing lateral diffusion of charge carriers thereby effecting a storage device having extremely high resolution.

6. A storing device in an information system as set forth in claim 5 including a guard ring surrounding the PN-junction to isolate the active area of said target.

7. A light sensitive storage system comprising in combination: a semiconductor target comprising a high-resistivity P-type substrate having an active region on one surface thereof, an N-type region being formed in said active region to produce a single PN-junction, said PN-junction producing a depletion region in said substrate adjacent said junction;
- means for scanning an electron beam across the exposed surface of said P-type substrate to extend said depletion region throughout the thickness of said substrate thereby charging said PN-junction to a reference potential, the surface of said P-type material facing said electron beam becoming substantially charged with electrons;
- means for directing light upon said N-type material to produce hole-electron pairs which diffuse to said PN-junction said holes being swept across said PN-junction to combine with electrons at said electron-charged surface thereby reducing said reference potential across said PN-junction by an amount proportional to the intensity of said light; and
- means for measuring the change in said reference potential stored by said target to produce a signal representing the intensity of light impinging on said target.

8. A light sensitive storage system as set forth in claim 7 wherein a guard ring is formed to surround said PN-junction to isolate the active area of said semiconductor target.

9. A light sensitive storage system as set forth in claim 7 further including a layer of high-resistivity material formed to overlie the exposed surface of said P-type material.

10. A light sensitive storage system comprising in combination:

a semiconductor target comprising a high-resistivity N-type substrate having an active region on one surface thereof, a P-type region being formed in said active region to produce a single PN-junction, said PN-junction producing a depletion region in said substrate adjacent said junction;

means for scanning an electron beam across the exposed surface of said P-type region to extend said depletion region throughout the thickness of said P-type material thereby charging said PN-junction to a reference potential, the exposed surface of said P-type material becoming charged with electrons;

means for directing light to impinge upon said N-type substrate to produce hole-electron pairs which diffuse to said PN-junction, said holes being swept across said PN-junction to combine with electrons at said electron-charged surface thereby reducing said reference potential across said single PN-junction by an amount proportional to the intensity of said light; and means for measuring the change in said reference potential stored by said target to produce a signal representing the intensity of light impinging on said target.

11. A light sensitive storage system as set forth in claim 10 wherein a guard ring is formed to surround said PN-junction to isolate the active area of said semiconductor target.

12. A light sensitive storage system as set forth in claim 10 further including a layer of high-resistivity material formed to overlie the exposed portion of said P-type material.

* * * * *